(12) United States Patent
Power et al.

(10) Patent No.: US 12,182,714 B2
(45) Date of Patent: Dec. 31, 2024

(54) METHODS FOR DETECTING EVENTS IN SPORTS USING A CONVOLUTIONAL NEURAL NETWORK

(71) Applicant: STATS LLC, Chicago, IL (US)

(72) Inventors: Paul Power, Leeds (GB); Jennifer Hobbs, Chicago, IL (US); Patrick Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 1006 days.

(21) Appl. No.: 16/254,128

(22) Filed: Jan. 22, 2019

(65) Prior Publication Data
US 2019/0228306 A1  Jul. 25, 2019

Related U.S. Application Data

(60) Provisional application No. 62/619,896, filed on Jan. 21, 2018.

(51) Int. Cl.
*G06N 3/08* (2023.01)
*G06N 3/084* (2023.01)
(Continued)

(52) U.S. Cl.
CPC ............. *G06N 3/084* (2013.01); *G06N 3/08* (2013.01); *G06N 20/00* (2019.01); *G06V 10/762* (2022.01);
(Continued)

(58) Field of Classification Search
CPC .......... G06N 3/08; G06N 20/00; H04L 67/10
See application file for complete search history.

(56) References Cited

U.S. PATENT DOCUMENTS

| 6,616,529 B1 | 9/2003 | Qian et al. |
| 6,710,713 B1 | 3/2004 | Russo |

(Continued)

FOREIGN PATENT DOCUMENTS

| CN | 1386241 | 12/2002 |
| CN | 1708697 A | 12/2005 |

(Continued)

OTHER PUBLICATIONS

Suraj Srinivas et al, "A Taxonomy of Deep Convolutional Neural Nets for Computer Vision", published in Frontiers in Robotics and AI, Jan. 2016, retrieved Mar. 18, 2018. (Year: 2016).*

(Continued)

*Primary Examiner* — Shourjo Dasgupta
(74) *Attorney, Agent, or Firm* — Bookoff McAndrews, PLLC

(57) ABSTRACT

A method of identifying a defensive alignment and an offensive alignment in a set-piece is disclosed herein. A computing system receives one or more streams of tracking data. The computing system identifies a set-piece contained in the one or more streams of tracking data. The computing system identifies a defensive alignment of a first team and an offensive alignment of a second team. The computing system extracts, via a convolutional neural network, one or more features corresponding to a type of defensive alignment implemented by the first team by passing the set-piece through the convolutional neural network. The computing system scans the set-piece, via a machine learning algorithm, to identify one or more features indicative of a type of offensive alignment implemented by the second team. The computing system infers the type of defensive alignment implemented by the first team.

17 Claims, 9 Drawing Sheets

US 12,182,714 B2

Page 2

(51) Int. Cl.
*G06N 20/00* (2019.01)
*G06V 10/762* (2022.01)
*G06V 10/764* (2022.01)
*G06V 10/82* (2022.01)
*G06V 20/40* (2022.01)
*H04L 67/10* (2022.01)

(52) U.S. Cl.
CPC ............ *G06V 10/764* (2022.01); *G06V 10/82* (2022.01); *G06V 20/42* (2022.01); *H04L 67/10* (2013.01)

(56) References Cited

U.S. PATENT DOCUMENTS

| | | | |
|---|---|---|---|
| 6,751,343 B1* | 6/2004 | Ferrell | G06F 16/5838 382/218 |
| 9,177,259 B1* | 11/2015 | Levchuk | G06N 20/00 |
| 9,342,785 B2 | 5/2016 | Lucey et al. | |
| 9,442,933 B2* | 9/2016 | Tzoukermann | G06F 16/48 |
| 9,740,984 B2* | 8/2017 | Lucey | G06N 5/043 |
| 10,062,033 B2* | 8/2018 | Lucey | G06V 20/42 |
| 10,201,752 B2 | 2/2019 | Lucey et al. | |
| 10,460,176 B2* | 10/2019 | Chang | H04N 21/251 |
| 11,157,742 B2 | 10/2021 | Zhang et al. | |
| 11,182,806 B1 | 11/2021 | Arfa et al. | |
| 11,232,109 B1 | 1/2022 | Knoll et al. | |
| 2002/0165697 A1 | 11/2002 | Min | |
| 2004/0148275 A1* | 7/2004 | Achlioptas | G06F 16/9535 |
| 2004/0148278 A1 | 7/2004 | Milo et al. | |
| 2005/0143198 A1 | 6/2005 | Charge | |
| 2006/0083304 A1 | 4/2006 | Pan et al. | |
| 2006/0149674 A1 | 7/2006 | Cook et al. | |
| 2006/0252476 A1 | 11/2006 | Bahou | |
| 2007/0293289 A1 | 12/2007 | Loeb | |
| 2008/0281444 A1 | 11/2008 | Krieger et al. | |
| 2009/0186679 A1 | 7/2009 | Irvine et al. | |
| 2009/0203447 A2 | 8/2009 | Hansen et al. | |
| 2010/0129780 A1 | 5/2010 | Homsi et al. | |
| 2010/0184495 A1 | 7/2010 | Levy et al. | |
| 2010/0184563 A1 | 7/2010 | Molyneux et al. | |
| 2010/0283630 A1 | 11/2010 | Alonso | |
| 2010/0298958 A1 | 11/2010 | Connelly | |
| 2011/0013087 A1 | 1/2011 | House et al. | |
| 2011/0169959 A1 | 7/2011 | DeAngelis et al. | |
| 2011/0173235 A1 | 7/2011 | Aman et al. | |
| 2011/0267461 A1 | 11/2011 | Birenboim et al. | |
| 2012/0162435 A1 | 6/2012 | Elangovan et al. | |
| 2012/0214602 A1 | 8/2012 | Ahlstrom | |
| 2013/0104870 A1 | 5/2013 | Rizzo et al. | |
| 2013/0110271 A1 | 5/2013 | Fornell et al. | |
| 2013/0225271 A1 | 8/2013 | Amaitis | |
| 2013/0238106 A1 | 9/2013 | Ellis et al. | |
| 2013/0267328 A1 | 10/2013 | Heisler et al. | |
| 2014/0058992 A1* | 2/2014 | Lucey | G06N 5/043 707/E17.089 |
| 2014/0142921 A1 | 5/2014 | Gleadall et al. | |
| 2014/0143183 A1 | 5/2014 | Sigal et al. | |
| 2014/0206479 A1 | 7/2014 | Marty et al. | |
| 2014/0236331 A1* | 8/2014 | Lehmann | G09B 19/0038 700/91 |
| 2014/0274245 A1 | 9/2014 | Stickel | |
| 2014/0302914 A1 | 10/2014 | Weinstein et al. | |
| 2014/0309000 A1 | 10/2014 | Gustafson | |
| 2014/0364976 A1 | 12/2014 | Wohl et al. | |
| 2015/0031845 A1* | 1/2015 | McCauley | C08F 36/04 526/140 |
| 2015/0058730 A1 | 2/2015 | Dubin et al. | |
| 2015/0131845 A1* | 5/2015 | Forouhar | G06V 20/42 382/100 |
| 2015/0141144 A1* | 5/2015 | Sprague | G06F 16/00 463/31 |
| 2015/0142716 A1 | 5/2015 | Lucey et al. | |
| 2015/0148129 A1 | 5/2015 | Austerlade et al. | |
| 2015/0169960 A1* | 6/2015 | Laksono | G06V 10/56 382/170 |
| 2015/0248917 A1* | 9/2015 | Chang | G11B 27/031 386/282 |
| 2015/0258416 A1 | 9/2015 | Ianni et al. | |
| 2015/0279429 A1* | 10/2015 | Laksono | G11B 27/031 386/241 |
| 2015/0360134 A1 | 12/2015 | Rodriguez | |
| 2016/0007054 A1 | 1/2016 | Polumbus et al. | |
| 2016/0096071 A1 | 4/2016 | Ianni et al. | |
| 2016/0148650 A1* | 5/2016 | Laksono | G11B 27/309 386/230 |
| 2016/0171028 A1* | 6/2016 | MacCall | G06F 16/78 707/738 |
| 2016/0182415 A1 | 6/2016 | Ames et al. | |
| 2016/0203279 A1 | 7/2016 | Srinivas et al. | |
| 2016/0220878 A1 | 8/2016 | Devathi | |
| 2016/0260015 A1 | 9/2016 | Lucey et al. | |
| 2016/0375365 A1 | 12/2016 | Thompson et al. | |
| 2017/0043260 A1 | 2/2017 | Austerlade et al. | |
| 2017/0061314 A1 | 3/2017 | Schnurr et al. | |
| 2017/0072321 A1 | 3/2017 | Thompson et al. | |
| 2017/0080336 A1 | 3/2017 | Groset | |
| 2017/0109015 A1 | 4/2017 | Krasadakis | |
| 2017/0132821 A1 | 5/2017 | Valliani et al. | |
| 2017/0165570 A1 | 6/2017 | Lucey et al. | |
| 2017/0166557 A1 | 6/2017 | Golden et al. | |
| 2017/0235848 A1 | 8/2017 | Van Dusen et al. | |
| 2017/0238055 A1 | 8/2017 | Chang et al. | |
| 2017/0238855 A1* | 8/2017 | Hoppe | A61B 5/6833 |
| 2017/0246539 A1 | 8/2017 | Schwartz et al. | |
| 2017/0255830 A1* | 9/2017 | Chen | G06V 20/41 |
| 2017/0257653 A1 | 9/2017 | Farre et al. | |
| 2017/0259178 A1 | 9/2017 | Aghdaie et al. | |
| 2017/0291093 A1 | 10/2017 | Janssen | |
| 2017/0330029 A1* | 11/2017 | Turcot | G06V 30/194 |
| 2018/0032858 A1* | 2/2018 | Lucey | G06F 16/9027 |
| 2018/0056124 A1 | 3/2018 | Marty et al. | |
| 2018/0084310 A1* | 3/2018 | Katz | G06F 16/7837 |
| 2018/0099201 A1 | 4/2018 | Marty et al. | |
| 2018/0137364 A1* | 5/2018 | Forouhar | G06V 20/42 |
| 2018/0157974 A1 | 6/2018 | Carr et al. | |
| 2018/0158196 A1 | 6/2018 | Marks | |
| 2018/0204111 A1 | 7/2018 | Zadeh et al. | |
| 2018/0213033 A1 | 7/2018 | Subbian | |
| 2018/0218243 A1 | 8/2018 | Felsen et al. | |
| 2019/0087661 A1 | 3/2019 | Lee et al. | |
| 2019/0205652 A1 | 7/2019 | Ray et al. | |
| 2019/0221072 A1 | 7/2019 | Litman | |
| 2019/0224556 A1 | 7/2019 | Ruiz et al. | |
| 2019/0228290 A1 | 7/2019 | Ruiz et al. | |
| 2019/0228306 A1 | 7/2019 | Power et al. | |
| 2019/0251366 A1* | 8/2019 | Zhong | G06V 20/41 |
| 2019/0374839 A1 | 12/2019 | Wanke et al. | |
| 2020/0004752 A1 | 1/2020 | Majumdar et al. | |
| 2020/0043287 A1 | 2/2020 | Zhang et al. | |
| 2020/0074181 A1 | 3/2020 | Chang et al. | |
| 2020/0170549 A1 | 6/2020 | Baykaner et al. | |
| 2020/0218902 A1 | 7/2020 | Chang et al. | |
| 2020/0230501 A1 | 7/2020 | Schwartz et al. | |
| 2020/0302181 A1 | 9/2020 | Bhanu et al. | |
| 2020/0336802 A1 | 10/2020 | Russell et al. | |
| 2020/0349611 A1 | 11/2020 | Publicover et al. | |
| 2020/0353311 A1 | 11/2020 | Ganguly et al. | |
| 2021/0056458 A1 | 2/2021 | Savova et al. | |
| 2021/0134124 A1 | 5/2021 | Srinivasan | |
| 2021/0142066 A1 | 5/2021 | Jayaram et al. | |
| 2021/0256256 A1 | 8/2021 | Gurpinar-Morgan et al. | |
| 2021/0272599 A1 | 9/2021 | Patterson et al. | |
| 2021/0304736 A1 | 9/2021 | Kothari et al. | |
| 2021/0383123 A1 | 12/2021 | Hobbs et al. | |
| 2021/0397846 A1 | 12/2021 | Chang et al. | |
| 2022/0055689 A1 | 2/2022 | Mandlekar et al. | |
| 2022/0067983 A1 | 3/2022 | Fidler et al. | |
| 2022/0253679 A1 | 8/2022 | Power et al. | |

(56) References Cited

U.S. PATENT DOCUMENTS

2022/0270004 A1    8/2022    Ruiz et al.
2022/0284311 A1    9/2022    Haynes et al.

FOREIGN PATENT DOCUMENTS

| | | |
|---|---|---|
| CN | 102819749 A | 12/2012 |
| CN | 105833502 | 8/2016 |
| KR | 10-0986647 | 10/2010 |
| WO | 0122270 A2 | 3/2001 |
| WO | 2013166456 A2 | 11/2013 |
| WO | 2014/008134 | 1/2014 |
| WO | 2015/076682 | 5/2015 |
| WO | 2017/031356 | 2/2017 |
| WO | 2017/161167 | 9/2017 |
| WO | 2020/010040 | 1/2020 |

OTHER PUBLICATIONS

Konstantin Knauf et al, "Spatio-temporal convolution kernels", published in Machine Learning, Jul. 2015, retrieved Mar. 18, 2018. (Year: 2015).*

Arden Dertat, "Applied Deep Learning- Part 4: Convolutional Neural Networks", published in Towards Data Science, and made available online on Nov. 8, 2017 at https://towardsdatascience.com/applied-deep-learning-part-4-convolutional-neural-networks-584bc134c1e2, retrieved Mar. 18, 2018. (Year: 2017).*

Edge AI and Vision Alliance, "Using Convolutional Neural Networks for Image Recognition", published Nov. 12, 2015 at https://www.edge-ai-vision.com/2015/11/using-convolutional-neural-networks-for-image-recognition, retrieved Mar. 18, 2018. (Year: 2015).*

Machine Learning Notebook, "Convolutional Neural Networks—Basics", published on Apr. 7, 2017 at https://mlnotebook.github.io/post/CNN1, retrieved on Mar. 18, 2022. (Year: 2017).*

Martijn Wagenaar et al, "Using Deep Convolutional Neural Networks to Predict Goal-Scoring Opportunities in Soccer", published in International Conference on Pattern Recognition Applications and Methods, 2017, retrieved Jun. 21, 2023. (Year: 2017).*

Charles Perin, etc., "SoccerStories: A Kick-off for Visual Soccer Analysis", published in IEEE Transactions on Visualization and Computer Graphics, vol. 19, No. 12, Dec. 2013, retrieved Apr. 26, 2024. (Year: 2013).*

Joachim Gudmunsson, etc., "Spatio-Temporal Analysis of Team Sports—A Survey", published in arXiv on Feb. 22, 2016, retrieved Apr. 26, 2024. (Year: 2016).*

Alina Bialkowski, etc., "Identifying Team Style in Soccer Using Formations Learned from Spatiotemporal Tracking Data", published in 2014 IEEE International Conference on Data Mining Workshop, pp. 9-14, Dec. 1, 2024, retrieved Apr. 26, 2024. (Year: 2014).*

Wei, "Modelling and predicting adversarial behaviour using large amounts of spatiotemporal data," Diss. Queensland University of Technology, 2016, 167 pages.

Liang, et al., "Dual motion gan for future-flow embedded video prediction," proceedings of the IEEE international conference on computer vision, 2017, 9 pages.

Maher, "Modelling Association Football Scores", Statistica Neerlandica 36, nr.3, 1982, pp. 109-118.

Dixon, et al., "Modelling Association Football Scores and Inefficiencies in the Football Betting Market", Appl Statist 46. No 2, 1997, pp. 265-280.

Koopman, et al., "A dynamic bivariate Poisson model for analysing and forecasting match results in the English Premier League", Journal of the Royal Statistical Society: Series A (Statistics in Society), Sep. 24, 2012, 30 pages.

Boshnakov, et al., "A Bivariate Weibull Count Model For Forecasting Association Football Scores", International Journal of Forecasting, Sep. 9, 2016, 13 pages.

Boice, "How Our Club Soccer Projections Work", FiveThirtyEight, https://fivethirtyeight.com/features/how-our-club-soccer-projections-work/, Jan. 19, 2017, 6 pages.

Goddard, et al., "Modelling football match results and the efficiency of fixed-odds betting", Working Paper, Department of Economics, Swansea University, 2004, 27 pages.

Huang, et al., "A Neural Network Method for Prediction of 2006 World Cup Football game", The 2010 international joint conference on neural networks, 2010, 8 pages.

Kharrat, et al., "Plus-Minus Player Ratings for Soccer", arXiv preprint arXiv:1706.04943, Jun. 16, 2017, 17 pages.

Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, May 15, 2017, 4 pages.

Beuoy, "Updated NBA Win Probability Calculator", InPredictable, http://www.inpredictable.com/2015/02/updated-nba-win-probability-calculator.html, Feb. 6, 2015, 4 pages.

Asif, et al., "In-Play forecasting of win probability in One-Day International cricket: A dynamic logistic regression model", International Journal of Forecasting 32, 2016, pp. 34-43.

Pelechrinis, "iWinRNFL: A Simple, Interpretable & Well-Calibrated In-Game Win Probability Model for NFL", arXiv preprint arXiv:1704.00197, Mar. 14, 2018, 7 pages.

Lock, et al., "Using random forests to estimate win probability before each play of an NFL game", Journal of Quantitative Analysis in Sports 10.2, 2014, pp. 197-205.

Schechtman-Rock, "Introducing NFLWin: An Open Source Implementation of NFL Win Probability", PhD Football, http://phdfootball.blogspot.com/2016/09/introducing-nflwin-open-source.html, Sep. 1, 2016, 4 pages.

Bishop, "Mixture Density Networks", Neural Computing Research Group Report, NCRG/94/004, Feb. 1994, 26 pages.

Kingma, et al., "Adam: A Method for Stochastic Optimization", arXiv preprint arXiv:1412.6980, ICLR 2015, Jan. 30, 2017, 15 pages.

Paine, "The Pats' Comeback Was Incredible—Even If You Think The Falcons Blew It", FiveThirtyEight, https://fivethirtyeight.com/features/patriots-falcons-comeback-super-bowl/, Feb. 6, 2017, 4 pages.

Deerwester, et al., "Indexing by Latent semantic Analysis", Journal of the American society for information science 41.6, 1990, 34 pages.

Blei, et al., "Latent Dirichlet Allocation", Journal of Machine Learning Research 3, 2003, pp. 993-1022.

Bengio, et al., "A Neural Probabilistic Language Model", Journal of Machine Learning Research 3, 2003, pp. 1137-1155.

Mikolov, et al., "Efficient Estimation of Word Representations in Vector Space", arXiv preprint arXiv:1301.3781, Sep. 7, 2013, 12 pages.

Mikolov, et al., "Distributed Representations of Words and Phrases and their Compositionality", Advances in neural information processing systems, 2013, 9 pages.

Ho, "Random Decision Forests", Proceedings of 3rd international conference on document analysis and recognition. vol. 1. IEEE, 1995, pp. 278-282.

Van den Oord, et al., "WaveNet: A Generative Model For Raw Audio", arXiv preprint arXiv:1609.03499, Sep. 19, 2016, 15 pages.

Chung, et al., "Hierarchical Multiscale Recurrent Neural Networks", ICLR 2017, Mar. 9, 2017, 13 pages.

Graves, "Generating Sequences with Recurrent Neural Networks", arXiv preprint arXiv:1308.0850, Dated Jun. 5, 2014, 43 pages.

Al-Shboul, et al., "Automated Player Selection for Sports Team using Competitive Neural Networks", International Journal of Advanced Computer Science and Applications (IJACSA), vol. 8, No. 8, 2017, pp. 457-460.

International Search Report and Written Opinion for PCT Application No. PCT/US2019/014609, dated Apr. 12, 2019, 10 pages.

International Search Report and Written Opinion for PCT Application No. PCT/US2019/014613, dated Apr. 12, 2019, 9 pages.

Lucey, et al., "Quality vs Quantity: Improved Shot Prediction in Soccer using Strategic Features from Spatiotemporal Data", 9th Annual MIT Sloan Sports Analytics Conference, 2015, 9 pages.

(56) References Cited

OTHER PUBLICATIONS

International Search Report and Written Opinion for PCT Application No. PCT/US2016/066733, dated Apr. 17, 2017, 11 pages.
Bialkowski, et al., "Large-Scale Analysis of Soccer Matches using Spatiotemporal Tracking Data", ICDM, 2014, 6 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Learned-Miller, "Data Driven Images Models through Continuous Joint Alignment", IEEE Transactions on Pattern Analysis and Machine Intelligence, vol. 28, No. 2, Feb. 2006, pp. 236-250.
Lucey, et al., "Representing and Discovering Adversarial Team Behaviors using Player Roles", CVPR, 2013, 8 pages.
Miller, et al., "Factorized Point Process Intensities: A Spatial Analysis of Professional Basketball", ICML, Jan. 8, 2014, 13 pages.
Peng, et al., "RASL: Robust Alignment by Sparse and Low-rank Decomposition for Linearly Correlated Images", PAMI, vol. 34, No. 11, 2012, 8 pages.
Sha, et al., "Chalkboarding: A New Spatiotemporal Query Paradigm for Sports Play Retrieval", IUI, 2016, 12 pages.
Wei, et al., "Predicting Serves in Tennis using Style Priors", KDD, 2015, 9 pages.
Yue, et al., "Learning Fine-Grained Spatial Models for Dynamic Sports Play Prediction", ICDM, 2014, 10 pages.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.
Pulling, "Long Corner Kicks in the English Premier League: Deliveries Into the Goal Ara and Critical Area", Kinesiology: International journal of fundamental and applied kinesiology 47.2, 2015, pp. 193-201.
Casal, et al., "Analysis of Corner Kick Success in Elite Football", International Journal of Performance Analysis in Sport 2015, pp. 430-451.
Bialkowski, et al., "Large-Scale Analysis of Soccer Matches using Spatiotemporal Tracking Data", IEEE International Conference on Data Mining, 2014, 6 pages.
Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.
Le, et al., "Data-Driven Ghosting using Deep Imitation Learning", MIT Sloan Sports Analytics Conference, Mar. 3-4, 2017, 15 pages.
Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Ross, et al., "Shortcomings in the attribution process: On the origins and maintenance of erroneous social assessments", Cambridge University Press, 1982, pp. 129-152.
Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.
Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.
Frey, et al., "Clustering by Passing Messages Between Data Points" Science Magazine, Feb. 15, 2007, 23 pages.
Anderson, et al., "The Nos. Game: Why Everything You Know About Soccer is Wrong", 2013, Penguin Books,.
Wang, et al., "Classifying NBA offensive plays using neural networks," Proceedings of MIT Sloan Sports Analytics Conference, vol. 4, 2016, 9 pages.
Sha, et al., "Fine-Grained Retrieval of Sports Plays using Tree-Based Alignment of Trajectories", arXiv preprint arXiv:1710.02255, Oct. 6, 2017, 10 pages.
Lee, et al., "Desire: Distant Future Prediction in Dynamic Scenes with Interacting Agents", Proceedings of the IEEE Conference on Computer Vision and Pattern Recognition, 2017, 10 pages.
Alahi, et al., "Social LSTM: Human Trajectory Prediction in Crowded Spaces", Proceedings of the IEEE conference on computer vision and pattern recognition, 2016, 11 pages.
Jain, et al., "Recurrent Neural Networks for Driver Activity Anticipation via Sensory-Fusion Architecture", IEEE International Conference on Robotics and Automation (ICRA), 2016, 8 pages.
Akhter, et al., "Bilinear Spatiotemporal Basis Models", ACM Transactions on Graphics, vol. 30, No. 2, Article 17, Apr. 2012, 12 pages.
Lucey, et al., "Representing and Discovering Adversarial Team Behaviors using Player Roles", Proceedings of the IEEE Conference on Computer Vision and Pattern Recognition, 2013, 8 pages.
Insafutdinov, et al., "ArtTrack: Articulated Multi-Person Tracking in the Wild", Proceedings of the IEEE Conference on Computer Vision and Pattern Recognition, 2017, 9 pages.
Le, et al., "Coordinated Multi-Agent Imitation Learning", Proceedings of the 34th International Conference on Machine Learning-vol. 70. JMLR. org, 2017, 13 pages.
Yamaguchi, et al., "Who are you with and Where are you going?", CVPR 2011. IEEE, 2011, 8 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Wang, et al., "Learning Optimal Parameters For Multi-target Tracking", International journal of computer vision 122.3 , 2017, 13 pages.
Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.
Chen, et al., "Learning Online Smooth Predictors for Realtime Camera Planning using Recurrent Decision Trees", Proceedings of the IEEE Conference on Computer Vision and Pattern Recognition, 2016, 14 pages.
Zheng, et al., "Generating Long-term Trajectories Using Deep Hierarchical Networks", Advances in Neural Information Processing Systems, 2016, 9 pages.
Felsen, et al., "What will Happen Next? Forecasting Player Moves in Sports Videos", Proceedings of the IEEE International Conference on Computer Vision, 2017, 10 pages.
Su, et al., "Social Behavior Prediction from First Person Videos", arXiv preprint arXiv:1611.09464, Nov. 29, 2016, 10 pages.
Koren, et al., "Matrix Factorization Techniques For Recommender Systems", Computer, IEEE Computer Society, Aug. 2009, 8 pages.
Deng, et al., "Factorized Variational Autoencoders for Modeling Audience Reactions to Movies", Proceedings of the IEEE Conference on Computer Vision and Pattern Recognition, 2017, 10 pages.
Charles, et al., "Personalizing Human Video Pose Estimation", Proceedings of the IEEE conference on computer vision and pattern recognition, 2016, 14 pages.
Kingman, et al., "Auto-Encoding Variational Bayes", arXiv preprint arXiv:1312.6114, May 1, 2014, 14 pages.
Gregor, et al., "DRAW: A Recurrent Neural Network For Image Generation", arXiv preprint arXiv:1502.04623, May 20, 2015, 10 pages.
Bowman, et al., "Generating Sentences from a Continuous Space", arXiv preprint arXiv:1511.06349, May 12, 2016, 12 pages.
Kingma, et al., "Semi-supervised Learning with Deep Generative Models", Advances in neural information processing systems, Oct. 31, 2014, 9 pages.
Sohn, et al., "Learning Structured Output Representation using Deep Conditional Generative Models", Advances in neural information processing systems, 2015, 9 pages.
Van den Oord, et al., "Pixel Recurrent Neural Networks", arXiv preprint arXiv:1601.06759, Aug. 19, 2016, 11 pages.
Pathak, et al., "Contect Encoders: Feature Learning by Inpainting", Proceedings of the IEEE conference on computer vision and pattern recognition, 2016, 12 pages.

(56) References Cited

OTHER PUBLICATIONS

Walker, et al., "An Uncertain Future: Forecasting from Static Images using Variational Autoencoders", European Conference on Computer Vision, 2016, 17 pages.
Arabzad, et al., "Football Match Results Prediction using Artificial Neural Networks; The Case of Iran Pro League", Journal of Applied Research on Industrial Engineering, vol. 1, No. 3, Oct. 9, 2014, pp. 159-179.
International Search Report and Written Opinion for PCT Application No. PCT/US2019/014614, dated Apr. 16, 2019, 9 pages.
International Search Report and Written Opinion for PCT Application No. PCT/US2019/014608, dated Apr. 15, 2019, 12 pages.
Blaikie, et al., "NFL & NCAA Football Prediction using Artificial Neural network," Proceedings of the Midstates Conference for Undergraduate Research in Computer Science and Mathematics, 2011, 8 pages.
Chandler, et al., "An exploratory study of minor league baseball statistics," Journal of Quantitative Analysis in Sports 8.4, 2012.
Zhao, et al., "Applying deep bidirectional LSTM and mixture density network for basketball trajectory prediction," Optik 158, Aug. 2017, pp. 266-272.
Perricone, et al., "Predicting Results for Professional Basketball Using NBA API Data," 2016, 6 pages.
Kinoshita, et al., "Deep mixture density network for statistical model-based feature enhancement," 2017 IEEE International Conference on Acoustics, Speech and Signal Processing (ICASSP), Mar. 2017, pp. 251-255.
Zhao, "Research and Application of Online Learning of Formation Strategy Based on Neural Network, Information Technology Collection of China Masters' Dissertations Full Text Database," No. 2, 2014, pp. 38-40.
U.S. Appl. No. 16/254,128, filed Jan. 22, 2019, Pending.
U.S. Appl. No. 16/254,088, filed Jan. 22, 2019, Pending.
U.S. Appl. No. 16/254,108, filed Jan. 22, 2019, Pending.
U.S. Appl. No. 16/254,037, filed Jan. 22, 2019, Pending.
U.S. Appl. No. 15/379,448, 2017-0165570, filed Dec. 14, 2016, Issued.
U.S. Appl. No. 15/627,296, 20180032858, filed Jun. 19, 2017, Issued.
Pourmehr, et al., "An Overview on Opponent Modeling in RoboCup Soccer Simulation 2D," Robot Soccer World Cup, Springer-Verlag, Berlin, Heidelberg, 2012, 13 pages.
Abreu, et al., "Improving a simulated soccer team's performance through a Memory-Based Collaborative Filtering approach," Elsevier B.V., Applied Soft Computing 23, 2014, pp. 180-193.
Carney, et al., "Predicting probability distributions for surf height using an ensemble of mixture density networks," Proceedings of the 22nd international conference on Machine learning, 2005, 8 pages.
Ji, et al., "NBA All-Star lineup prediction based on neural networks," 2013 International Conference on Information Science and Cloud Computing Companion, 2013, pp. 864-869.
Pettersson, et al., "Football match prediction using deep learning, " Department of Electrical Engineering, Chalmers University of Technology, 2017, 72 pages.
Merhej, et al., "What Happened Next? Using Deep Learning to Value Defensive Actions in Football Event-Data," KDD, Aug. 2021, pp. 3394-3403.
PCT International Application No. PCT/US22/15240, International Search Report and Written Opinion of the International Searching Authority, dated May 11, 2022, 7 pages.
Hubácek, et al., "Lifted Relational Team Embeddings for Predictive Sports Analytics," ILP Up-and-Coming/Short Papers, 2018, 7 pages.
Dinsdale, et al., "Interactive Gaming in Sports," U.S. Appl. No. 17/934,756, filed Sep. 23, 2022, 39 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.

Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.
Tian, et al., "Use of machine learning to automate the identification of basketball strategies using whole team player tracking data," Applied Sciences 10.1, Dec. 18, 2019, 17 pages.
PCT International Application No. PCT/US21/34568, International Search Report and Written Opinion of the International Searching Authority, dated Aug. 25, 2021, 9 pages.
Wagenaar, et al. "Using deep convolutional neural networks to predict goal-scoring opportunities in soccer," International Conference on Pattern Recognition Applications and Methods, vol. 2, SCITEPRESS, 2017, 8 pages.
Stein, et al. "Bring it to the pitch: Combining video and movement data to enhance team sport analysis," IEEE transactions on visualization and computer graphics 24.1,2017,, pp. 13-22.
PCT International Application No. PCT/US21/16583, International Search Report and Written Opinion of the International Searching Authority, dated Apr. 23, 2021, 11 pages.
Mehrotra, "Elements of artifical neural networks," MIT Press, 1997.
Acuna, "Unsupervised modeling of the movement of basketball players using a deep generative model," 31st Conference on Neural Information Processing Systems, 2017, 11 pages.
Felsen, et al., "Where will they go? predicting fine-grained adversarial multi-agent motion using conditional variational autoencoders," Proceedings of the European conference on computer vision (ECCV), 2018, pp. 761-776.
Nakashima, et al., "Off-line learning of soccer formations from game logs," 2010 World Automation Congress, 2010, 6 pages.
Janetzko, et al., "Feature-driven visual analytics of soccer data," 2014 IEEE conference on visual analytics science and technology (VAST), Nov. 2014, pp. 13-22.
Wagenaar, "Predicting Goal-Scoring Opportunities in Soccer by Using Deep Convolutional Neural Networks," Department of Artificial Intelligence, University of Groningen, Nov. 16, 2016, 65 pages.
Abreu, et al., "Improving a simulated soccer team's performance through a Memory-Based Collaborative Filtering approach," Applied Soft Computing 23, 2014, pp. 180-193.
McCabe, et al., "Artificial intelligence in sports prediction," Fifth International Conference on Information Technology: New Generations, IEEE Computer Society, Apr. 9, 2008, 4 pages.
Abdullah, et al., "Intelligent prediction of soccer technical skill on youth soccer player's relative performance using multivariate analysis and artificial neural network techniques," International Journal on Advanced Science, Engineering and Information Technology 6.5, Dec. 2016, pp. 668-674.
Preferred Networks, Inc., "Football Analytics using Deep Learning," YouTube, https://www.youtube.com/watch?v=hs_v3dv6OUI, Jul. 25, 2019, 3 pages.
Power, et al., "Not all passes are created equal: Objectively measuring the risk and reward of passes in soccer from tracking data," Proceedings of the 23rd ACM SIGKDD international conference on knowledge discovery and data mining, Aug. 2017, pp. 1605-1613.
Cervone, et al., "A multiresolution stochastic process model for predicting basketball possession outcomes," Journal of the American Statistical Association 111.514, 2016, pp. 585-599.
Ruiz, et al., " The Leicester City Fairytale?" Utilizing New Soccer Analytics Tools to Compare Performance in the 15/16 & 16/17 EPL Seasons, Proceedings of the 23rd Acm Sigkdd International Conference on Knowledge Discovery and Data Mining, 2017, 13 pages.
Gyarmati, et al., "Searching for a unique style in soccer," arXiv preprint arXiv:1409.0308, 2014, 4 pages.
PCT International Application No. PCT/US21/53117, International Search Report and Written Opinion of the International Searching Authority, dated Jan. 14, 2022, 9 pages.
PCT International Application No. PCT/US22/77383, International Search Report and Written Opinion of the International Searching Authority, dated Dec. 13, 2022, 15 pages.
PCT International Application No. PCT/US22/76934, International Search Report and Written Opinion of the International Searching Authority, dated Dec. 13, 2022, 10 pages.

(56) References Cited

OTHER PUBLICATIONS

Trainor, "Goalkeepers: How repeatable are shot saving performances?", STATSBOMB, https://statsbomb.com/2014/10/goalkeepers-how-repeatable-are-shot-saving-performances/, Oct. 21, 2014.
Newton, "How Youtub Perfected The Feed", The Verge, https://www.theverge.com/2017/8/30/16222850/youtube-google-brain-algorithm-video-recommendation-personalized-feed, Aug. 30, 2017.
Covington, et al., "Deep neural networks for youtube recommendations", Proceedings of the 10th ACM conference on recommender systems, pp. 191-198, Sep. 2016.
Cheng, et al., "Wide & deep learning for recommender systems", Proceedings of the 1st workshop on deep learning for recommender systems, Sep. 2016.
Alcorn, "(batter|pitcher) 2vec: statistic-free talent modeling with neural player embeddings", MIT Sloan Sports Analytics Conference, 2018.
Wei, et al., "The thin edge of the wedge: Accurately predicting shot outcomes in tennis using style and context priors", Proceedings of the 10th Annual MIT Sloan Sport Anal Conference, Mar. 2016.
Seidl, et al., "Bhostgusters: Realtime interactive play sketching with synthesized NBA defenses", Proceeding of the 12th MIT Sloan Sports Analytics Conference, 2018.
Maaten,et al., "Visualizing data using t-SNE", Journal of machine learning research Sep. 2008, pp. 2579-2605, Nov. 2008.
Felsen, et al., "Body shots: Analyzing shooting styles in the NBA using body pose", MIT Sloan, Sports Analytics Conference, Mar. 2017.
Office Action for European Patent Application No. 20801519.8, mailed Jun. 6, 2023, 1 page.
Extended European Search Report for Application No. 20801519.8, dated May 19, 2023, 7 pages.
International Preliminary Report on Patentability for the Application No. PCT/US2021/053117, mailed Apr. 13, 2023, 8 pages.
El-Far M., et al., "CD160 Isoforms and Regulation of CD4 and CD8 T-Cell Responses," Journal of Translational Medicine, 2014, vol. 12, No. 1, pp. 1-16.
Examination Report No. 1 for Australian Patent Application No. 2022201634 dated Mar. 7, 2023, 4 Pages.
Extended European Search Report for European Application No. 16876628.5, mailed Jan. 29, 2020, 17 Pages.
Extended European Search Report for European Application No. 19740811.5, mailed Sep. 21, 2021, 10 Pages.
Extended European Search Report for European Application No. 19741311.5, mailed Sep. 15, 2021, 09 Pages.
Extended European Search Report for European Application No. 19741603.5, mailed Jun. 2, 2022, 11 Pages.
Extended European Search Report for European Application No. 19741793.4, mailed Jun. 28, 2022, 10 Pages.
Extended European Search Report for European Application No. 20765556.4, mailed Oct. 7, 2022, 12 Pages.
International Preliminary Report on Patentability for International Application No. PCT/US2016/066733, mailed Jun. 28, 2018, 9 Pages.
International Preliminary Report on Patentability for International Application No. PCT/US2019/014608, mailed Jul. 30, 2020, 10 Pages.
International Preliminary Report on Patentability for International Application No. PCT/US2019/014609, mailed Jul. 30, 2020, 08 Pages.
International Preliminary Report on Patentability for International Application No. PCT/US2019/014613, mailed Jul. 30, 2020, 07 Pages.
International Preliminary Report on Patentability for International Application No. PCT/US2019/014614, mailed Jul. 30, 2020, 6 Pages.
International Preliminary Report on Patentability for International Application No. PCT/US2020/020432, mailed Sep. 16, 2021, 10 Pages.
International Preliminary Report on Patentability for International Application No. PCT/US2020/032053, mailed Nov. 18, 2021, 08 Pages.
International Preliminary Report on Patentability for International Application No. PCT/US2021/016583, mailed Aug. 18, 2022, 11 Pages.
International Preliminary Report on Patentability for International Application No. PCT/US2021/034568 , mailed Dec. 15, 2022, 8 Pages.
International Search Report and Written Opinion for International Application No. PCT/US2020/020432, mailed May 28, 2020, 11 Pages.
International Search Report and Written Opinion for International Application No. PCT/US2020/032053, mailed Sep. 29, 2020, 09 Pages.
Nikolova M.H., et al., "The CD160+ CD8high Cytotoxic T Cell Subset Correlates with Response to HAART in HIV-1+ Patients," Cellular Immunology, Oct. 2005, vol. 237, No. 2, pp. 96-105.
Partial Supplementary European Search Report for European Application No. 16876628.5, mailed Aug. 14, 2019, 16 Pages.
Wei X., et aL, "Large-Scale Analysis of Formations in Soccer," Proceedings of the Digital Image Computing: Technqiues and Applications (DICTA), IEEE, Nov. 26, 2013, pp. 1-8, XP032536466, DOI: 10.1109/DICTA.2013.6691503.

\* cited by examiner

FIG. 7A

METHODS FOR DETECTING EVENTS IN SPORTS USING A CONVOLUTIONAL NEURAL NETWORK

CROSS-REFERENCE TO RELATED APPLICATIONS

This application claims reference to U.S. Provisional Application Ser. No. 62/619,896, filed Jan. 21, 2018, which is hereby incorporated by reference in its entirety.

FIELD OF THE INVENTION

The present disclosure generally relates to a system and method for classifying offensive and defensive team alignments.

BACKGROUND

In 2016-2017 English Premier League season, about 16% of all goals scored came from set-pieces (e.g., corners and free kicks). However, there exists a great disparity in those numbers as a team, such as West Bromwich Albion scored 16 out of their 43 goals from set-pieces (>35% of their goals), while other obtain less than 7% of their goals from set-pieces (e.g., Sunderland scored 2 out of their 29 goals from set-pieces). The gap in resources between the richest and poorest teams in world football is growing wider each season as demonstrated by Paris Saint-Germain spending a word record 220 million Euro on Neymar, who scored 15 goals. The ability for a small market team to replicate the same goal output for the price of an effective set-piece strategy is a market inefficiency that may be exploited. Accordingly, a new method that can help teams exploit such inefficiency would be a key advantage.

SUMMARY

Embodiments disclosed herein generally relate to a system and method for classifying offensive and defensive team alignments. In some embodiments, a method of identifying a defensive alignment and an offensive alignment in a set-piece is disclosed herein. A computing system receives one or more streams of tracking data associated with one or more matches. The computing system identifies a set-piece contained in the one or more streams of tracking data. The computing system identifies a defensive alignment of a first team and an offensive alignment of a second team. The computing system extracts, via a convolutional neural network, one or more features corresponding to a type of defensive alignment implemented by the first team by passing the set-piece through the convolutional neural network. The computing system scans the set-piece, via a machine learning algorithm, to identify one or more features indicative of a type of offensive alignment implemented by the second team. The computing system infers, via the machine learning algorithm, the type of defensive alignment implemented by the first team based at least one the one or more features and the one or more extracted features.

In some embodiments, a system for identifying a defensive alignment and an offensive alignment in a set-piece is disclosed herein. The system includes a processor and a memory. The memory has programming instructions stored thereon, which, when executed by the processor, performs one or more operations. One or more operations include one or more streams of tracking data associated with one or more matches. The one or more operations further include identifying a set-piece contained in the one or more streams of tracking data. The one or more operations further include identifying a defensive alignment of a first team and an offensive alignment of a second team. The one or more operations further include extracting, via a convolutional neural network, one or more features corresponding to a type of defensive alignment implemented by the first team by passing the set-piece through the convolutional neural network. The one or more operations further include scanning the set-piece, via a machine learning algorithm, to identify one or more features indicative of a type of offensive alignment implemented by the second team. The one or more operations further include inferring, via the machine learning algorithm, the type of defensive alignment implemented by the first team based at least one the one or more features and the one or more extracted features.

In some embodiments, a non-transitory computer readable medium is disclosed herein. The non-transitory computer readable medium includes one or more sequences of instructions that, when executed by the one or more processors causes one or more operations. A computing system receives one or more streams of tracking data associated with one or more matches. The computing system identifies a set-piece contained in the one or more streams of tracking data. The computing system identifies a defensive alignment of a first team and an offensive alignment of a second team. The computing system extracts, via a convolutional neural network, one or more features corresponding to a type of defensive alignment implemented by the first team by passing the set-piece through the convolutional neural network. The computing system scans the set-piece, via a machine learning algorithm, to identify one or more features indicative of a type of offensive alignment implemented by the second team. The computing system infers, via the machine learning algorithm, the type of defensive alignment implemented by the first team based at least one the one or more features and the one or more extracted features.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 7A is a block diagram illustrating a Hinton diagram illustrating a team's offensive and defensive set-piece style, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method for classifying and identifying defensive and offensive alignments in a set-piece during a match. For example, the one or more techniques described herein present an attribute-driven approach to set-piece analysis, which utilizes a hybrid of deep-learning methods to detect complex attributes such as defensive marking schemes and hand-crafted features to enable interpretability.

Such techniques differ from conventional operations for analyzing set-pieces during a match. In particular, when analyzing defensive alignments of set-pieces, conventional techniques are not adequate to capture the nuances of corner behavior. For example, previous methods have used a template approach to player positions to a role. Such methods may be useful for boosting prediction tasks during open play, such as predicting expected goal value of a shot or modeling defensive behavior where player motion path is relatively linear with few role swaps. However, such approaches assume that all the players are important and present in the play, which is often not the case for set-pieces. For example, some attacking teams may keep three defenders back, meaning there could be four attackers against eight defenders.

Another conventional approach involves taking a bottom-up/feature-creating approach, where the distance and angle between players is calculated. This approach, however, is limited by the immense number and complexity of the features needed to capture the nuances of a defensive alignment. Further, as the area around the goal may be rather small, with the distance closes to the goal being the most important, fine-nuanced movement may be ignored by large movements of a few players.

Even though the current approaches are inadequate to capture such behavior, the fine-grained space, variable number of players and different motion patterns (short and long) lend themselves to image-based representations. The one or more techniques disclosed herein take advance of such approaches through the implementation of deep-learning methods.

Figure 1:
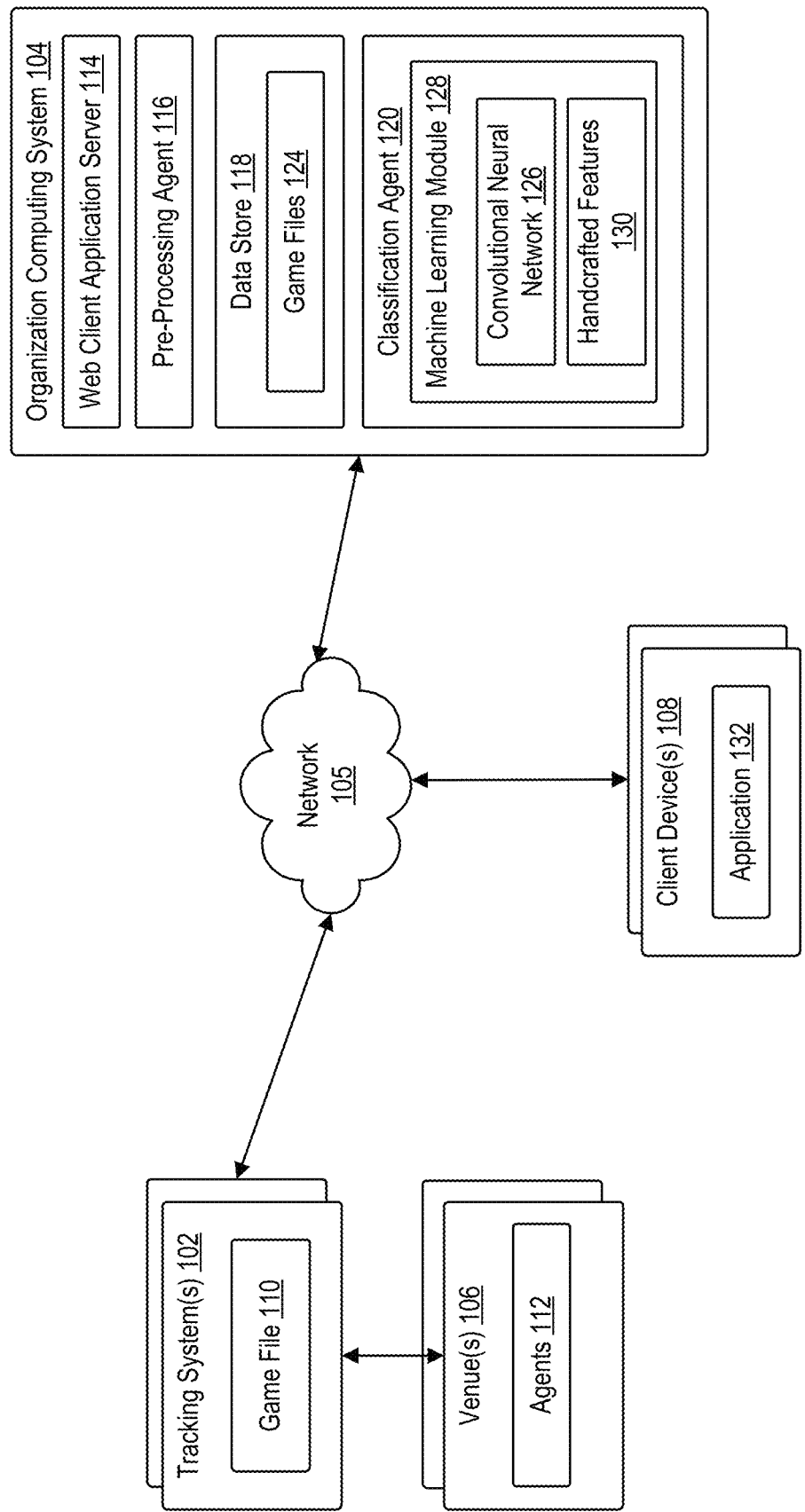
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x,y) position) for all agents and objects on the playing surface for each frame in a game file 110.

Game file 110 may be augmented with other event information corresponding to the captured one or more frames, such as, but not limited to, game event information (pass, made shot, turnover, etc.) and context information (current score, time remaining, etc.). In some embodiments, game file 110 may include one or more set-pieces during a match (e.g., in soccer). A set-piece may be defined as a portion of a match, in which play is started (or re-started) following a stoppage. Exemplary set-pieces may include a corner kick or a free kick in soccer, an in-bounds play in basketball, a face-off in hockey, and the like.

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing engine 116, a data store 118, and classification agent 120. Each of pre-processing engine 116 and classification agent 120 may be comprised of one or more software modules.

The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Classification agent 120 may be configured to analyze one or more frames of gameplay and classify a defensive alignment of a particular team in a match. For example, classification agent 120 may utilize an attribute-driven approach to set-piece analysis, which may utilize a hybrid of deep-learning methods to detect complex attributes such as defensive marking schemes, and hand crafted features to enable interpretability. Classification agent 120 may include a machine learning module 128. Machine learning module 128 may include CNN 126 and one or more pre-defined, or hand-crafted, features 130.

CNN 126 may be configured to analyze one or more sets of tracking data corresponding to a set-piece during a match and extract both the offensive and defensive structures of the teams. In some embodiments, the one or more sets of tracking data provided to CNN 126 may have an image-based representation. For example, CNN 126 may be trained to extract one or more defensive structures of a given team based on a training data set.

Machine learning module 128 may be configured to classify one or more extracted features from the one or more sets of tracking data based, in part, on one or more pre-defined, or hand-crafted, features 130. For example, machine learning module 128 may be trained to classify an offensive structure from one or more extracted features of the set-piece, based on one or more hand-crafted features 130 defined by an end user. Machine learning module 128 may further be trained to classify a defensive structure, based on one or more extracted features of the set piece. For example, machine learning module 128 may include one or more instructions to train a prediction model used by classification agent 120. To train the prediction model, machine learning module 128 may receive, as input, one or more streams of data from data store 118. The one or more streams of user activity may include one or more extracted set-pieces features in one or more matches. In some embodiments, machine learning module 128 may further receive, as input, the one or more hand-crated features 130. Machine learning module 128 may implement one or more machine learning algorithms to train the prediction model. For example, machine learning module 128 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like.

Accordingly, classification agent 120 may implement a combination of a CNN 126, which learns one or more features to extract, and a machine learning module 128, which learns to perform the classification task from the relevant features. As such, classification agent 120 may be able to fully provide an overview of the approach taken by the offense and the approach taken by the defense in a particular set-piece.

Pre-processing agent 116 may be configured to process data retrieved from data store 118 prior to input to classification agent 120. For example, pre-processing agent 116 may be configured to parse the one or more streams of tracking data to identify one or more set-pieces contained therein. Pre-processing agent 116 may then extract the one or more portions of the tracking data that includes one or more set-pieces from the one or more streams of data and normalize the one or more portions containing set-pieces for processing.

Data store 118 may be configured to store one or more game files 122. Each game file 122 may be captured and generated by a tracking system 102. In some embodiments, each of the one or more game files 122 may include all the raw data captured from a particular game or event. For example, the raw data captured from a particular game or event may include each set-piece event in each game.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
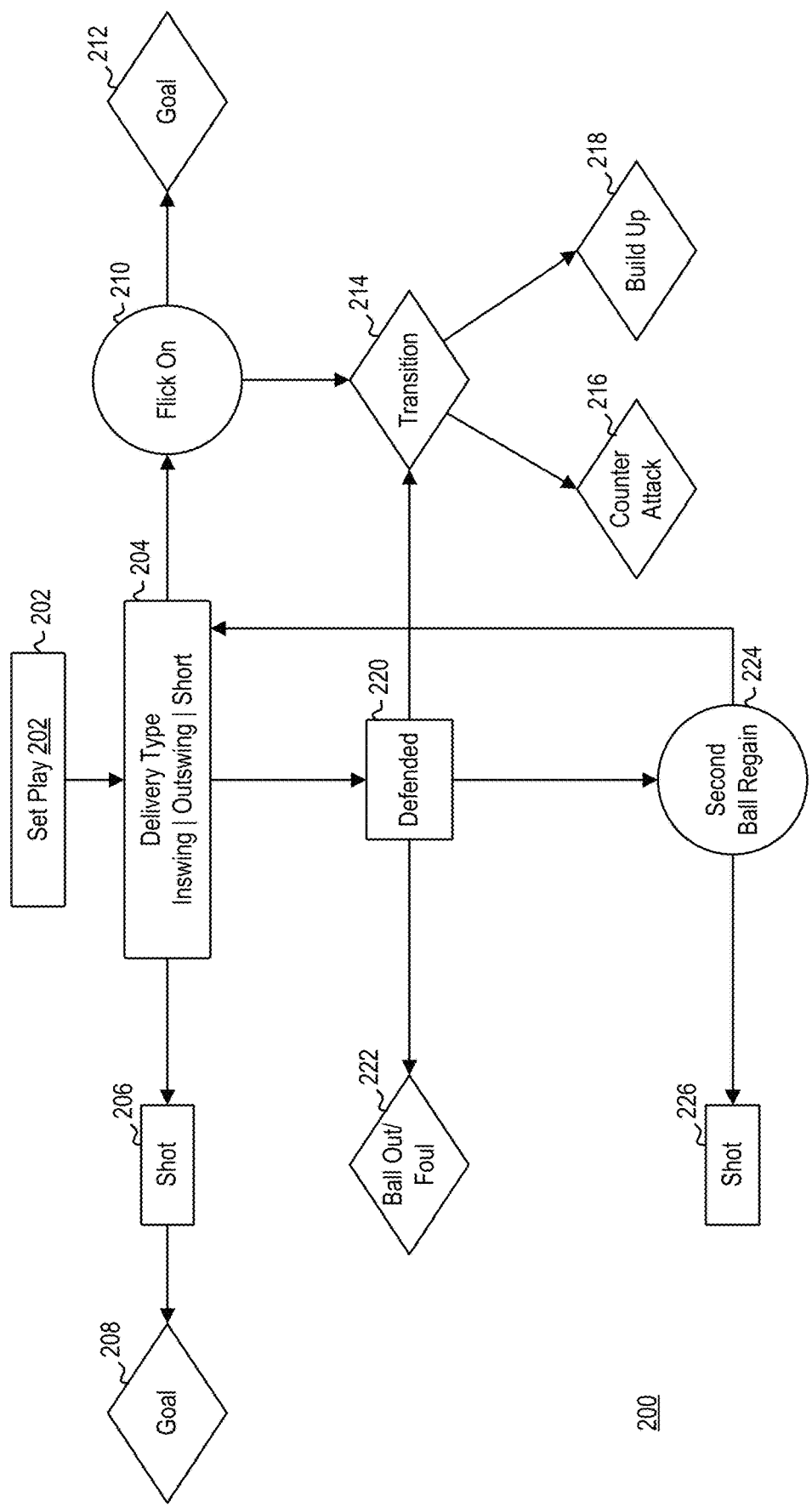
FIG. 2 is a block diagram illustrating a set-piece grammar model that may define one or more hand-crafted features for machine learning module, according to example embodiments.

FIG. 2 is a block diagram illustrating a set-piece grammar model 200 that may define one or more hand-crafted features 130 for machine learning module 128, according to example embodiments. Generally, the information used for analysis may contain at least agent and ball x, y coordinates. In some embodiments, the information used for analysis may further include one or more event labels, such as, but not limited to, header, shot, clearance, and the like.

To capture the evolving dynamics of a set-piece, an end user may define set-piece grammar model 200 (hereinafter "model 200") based on domain expertise. Model 200 may define the temporal sequencing of events during a given set-piece, which may allow for a robust identification in set-pieces with variable number of phases. For example, a corner kick should start with an in-swinging cross, which may be flicked-on at the near post for a second attacker to score. This example has a clear beginning, middle, and end. However, in another example, an attacking free-kick may be passed short for it to be crossed into the penalty area, which may then be cleared by a defender only to be regained by an attacker and crossed back into the penalty area for the goalkeeper to claim and drop at the attacker's feet to score. This second example is much more complex with three potential moments when the set-piece may be deemed to be finished (e.g., initial clearance, goalkeeper claim, or goal). Model 200 attempts to define a grammar, which enables multiple phases to occur.

Model 200 may be configured to capture the start and end of a set-piece and the specific type of events that may occur in-between. Such model allows machine learning module 128 to move away from just looking at first contact after a set-piece delivery and capture which teams may be able to create goals via flick-ons (e.g., single-motion pass) and second ball regains (which may be thought of as rebounds). Machine learning module 128 may also be able to measure which defending teams are able to transition into counter attacks.

As illustrated, each set play 202 may start with some delivery type 204. Exemplary delivery types may be an in-swing, an out-swing, and a short (e.g., one or more passes). One possible path from 204 may be a shot 206. Shot 206 may lead to a goal 208. Another possible path from 204 may be a flick-on 210. In some embodiments, a flick-on 210 may lead to a goal 212. In some embodiments, a flick-on may lead to a transition 214. For example, a transition may lead to a counter-attack (e.g., offense goes to defense as defense goes to offense) or a build-up.

Another possible path from 204 may be that delivery type 204 is defended 220. One possible path from defended 220 may be a ball out/foul 222 (e.g., a defensive player is either fouled or the ball goes out-of-bounds). Another possible path from defended 220 may be second ball regain 222. For example, an offensive player may shoot the ball at the goalie; the goalie successfully defends the shot; and the offensive player (or another offensive player) regains control via a rebound. In some embodiments, following a second shot regain 224, model 200 may revert back to delivery type 204 (i.e., another sort of pass between offensive players).

Machine learning module 128 may be trained to classify offensive alignments using the one or more hand-crafted features 130 defined by model 200. For example, machine learning module 128 may be trained to perform prediction using the hand-crafted features when analyzing tracking data corresponding to a set-piece. Once a grammar is laid out for machine learning module 128, fine-grain information (e.g., location of the delivery) may also be incorporated into the machine learning process.

Figure 3A:
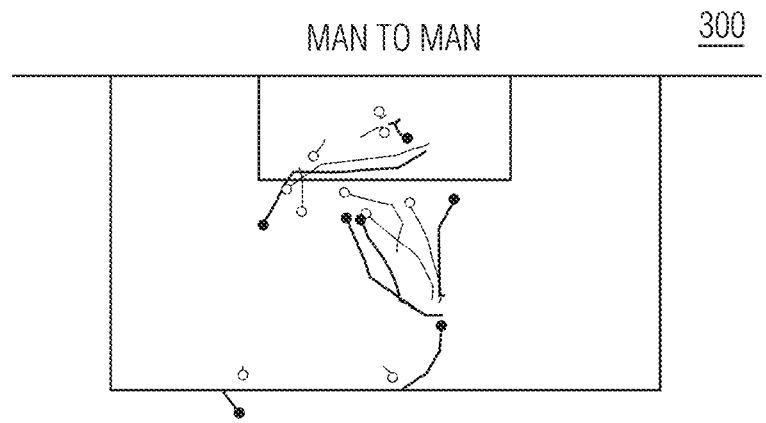
FIG. 3A is a block diagram illustrating a graphical representation of a defensive alignment for a set-piece, according to example embodiments.
Figure 3B:
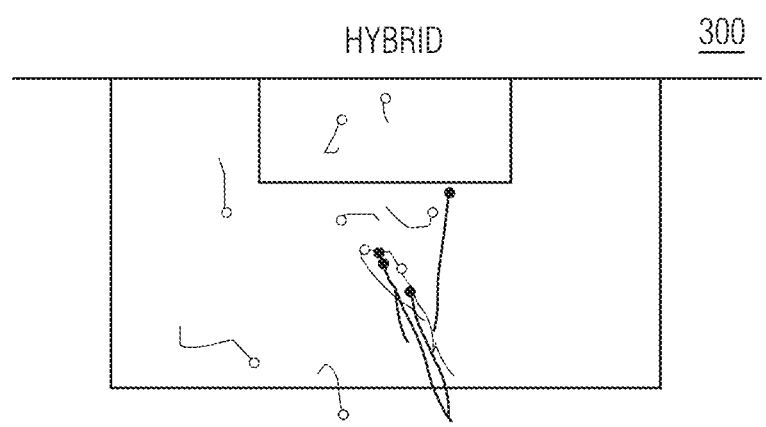
FIG. 3B is a block diagram illustrating a graphical representation of a defensive alignment for a set-piece, according to example embodiments.
Figure 3C:
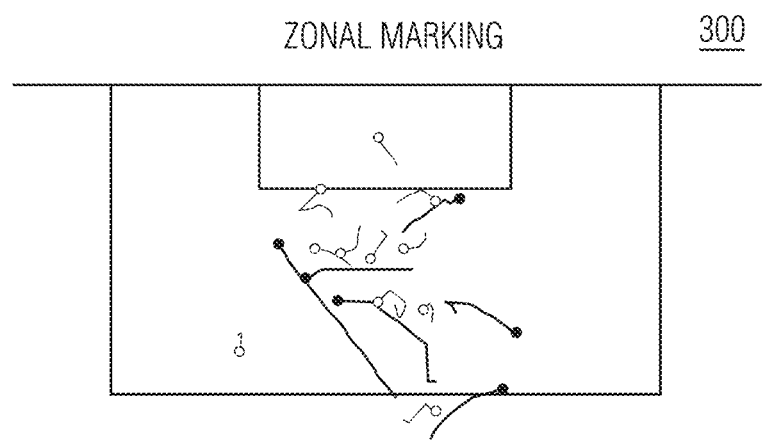
FIG. 3C is a block diagram illustrating a graphical representation of a defensive alignment for a set-piece, according to example embodiments.

FIG. 3A-3C illustrate one or more graphical representations of defensive set-ups for a set-piece, according to example embodiments. FIG. 3A represents a graphical representation 300 of man-to-man coverage during a set-piece. FIG. 3B represents a hybrid approach (e.g., man-to-man mixed with zone) to coverage during a set-piece. FIG. 3C represents a zonal marking approach to coverage during a set-piece.

Even though, as discussed earlier, conventional approaches are inadequate in capturing such defensive behavior, the fine-grained space, variable number of agents, and different motion patterns (short and long) lend themselves to an image-based representation. As such, classification agent 120 may utilize CNN 126 to learn one or more relative predictive features from one or more sets of tracking data corresponding to one or more set-pieces by, for example, identifying local edge patterns and/or interactions, and composing them together in a hierarchical way to better represent the tracking data. Accordingly, CNN 126 may be trained to extract such one or more predictive features from set piece information.

Figure 4:
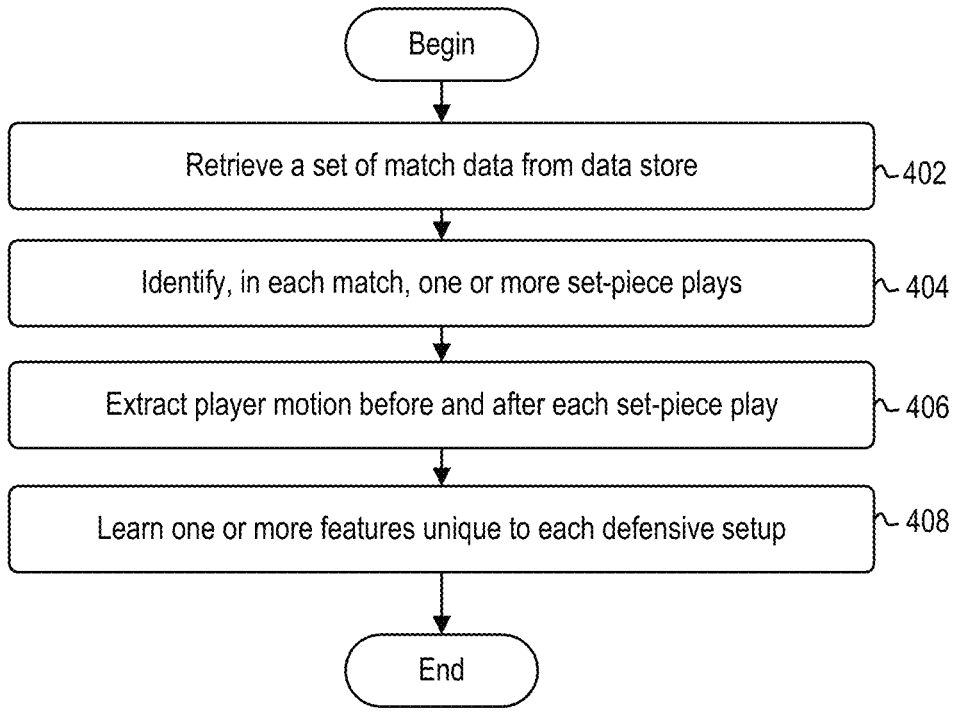
FIG. 4 is a flow diagram illustrating a method of training a convolutional neural network, according to example embodiments.

FIG. 4 is a flow diagram illustrating a method 400 of training CNN 126 to classify a defensive set-up in a set-piece, according to example embodiments. Method 400 may begin at step 402.

At step 402, pre-processing engine 116 may retrieve one or more sets of match data from data store 118. For example, pre-processing engine 116 may retrieve one or more sets of tracking data to generate the training set for CNN 126. Such match data may include may include spatial event data that captures every touch of the ball, with x, y coordinates and time stamps.

At step 404, pre-processing engine 116 may parse the one or more sets of match data for one or more set-piece plays contained therein. In other words, pre-processing engine 116 may be configured to filter the one or more sets of match data to identify those portions of the match data that include a set-piece play. Such set-piece plays may include, for example, a corner kick or a free kick.

At step 406, pre-processing engine 116 may extract out of the one or more sets of match data one or more portions containing player motion before and after a set-piece occurs. For example, pre-processing engine 116 may extract out of the one or more sets of match data one or more portions containing player motion two-seconds before a corner kick is taken and two-seconds after the corner kick is taken.

At step 408, CNN 126 may learn one or more unique features that define each particular defensive set (e.g., man-to-man, hybrid, zonal marking). In some embodiments, CNN 126 may further learn one or more unique features that define specific defender locations, such as whether the defense has players near the back post, back post/zone, front post, front zone, front post zone, both posts, and the like. For example, CNN 126 may undergo a backpropagation process, using the tracking data, such that CNN 126 may learn one or more unique features of each defensive set. In some embodiments, the architecture of CNN 126 includes two hidden layers. For example, CNN 126 may have a first hidden layer with 80 neurons and a second hidden layer with 50 neurons. Although the aforementioned example discusses hidden layers with 80 neurons and 50 neurons respectively, those skilled in the art readily understand that such discussion should not be limited to the above example. For example, rectified linear unit ("ReLu") activation may be applied at each layer with a softmax log it function used for use with final label prediction. Although ReLu activation may be used in the aforementioned example, those skilled in the art may readily understand that other forms of activation may be used. By utilizing the tracking data, CNN 126 may be able to handle a variable number of agents and also capture the interaction of agents near each other without handcrafting the distances and angles at every frame.

Figure 5:
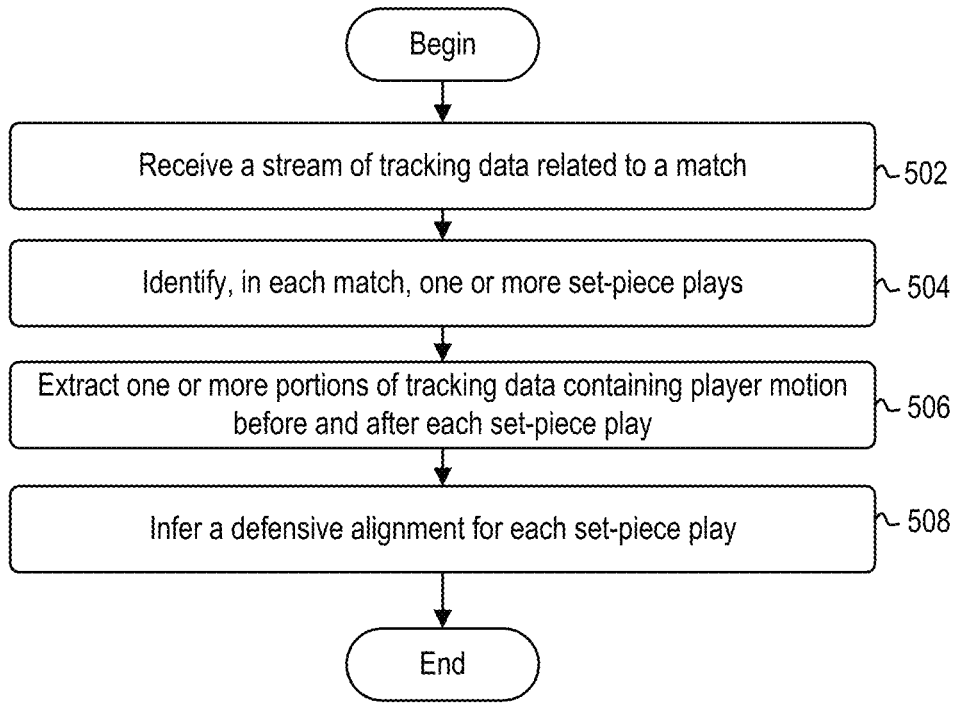
FIG. 5 is a flow diagram illustrating a method of classifying a defensive alignment in a set-piece, according to example embodiments.

FIG. 5 is a flow diagram illustrating a method 500 of classifying a defensive alignment in a set-piece according to example embodiments. Method 500 may begin at step 502.

At step 502, classification agent 120 may receive a tracking data related to a match. In some embodiments, the tracking data may be captured by tracking system 102. In some embodiments, the stream of images may be live (or near live) data or historical data. In some embodiments, the tracking data may have an image-like representation. In some embodiments, the tracking data may include a stream of images may be a video feed stored in data store 118.

At step 504, pre-processing engine 116 may parse the tracking data for one or more set-piece plays contained therein. In other words, pre-processing engine 116 may be configured to filter the tracking data to identify those portions of the match data that include a set-piece play. Such set-piece plays may include, for example, a corner kick or a free kick, an in-bounds play, a free-throw, a snap, a faceoff, etc.

At step 506, pre-processing engine 116 may extract from the tracking data one or more portions corresponding to player motion before and after a set-piece occurs. For example, pre-processing engine 116 may extract from the tracking data one or more portions of the tracking data that includes player motion two-seconds before a corner kick is taken and two-seconds after the corner kick is taken.

At step 508, CNN 126 may extract one or more features of offense and the defense in the one or more set plays based on the unique identifiers learned in the training process. For example, CNN 126 may identify the defensive team in the tracking data, and extract one or more unique identifiers contained therein. Such unique identifiers may correspond to one or more of man-to-man, hybrid, and zonal marking. CNN 126 may further be able to identify whether the defense has players have defenders near the back post, back post/zone, front post, front zone, front post zone, both posts, and the like. In another example, CNN 126 may identify the offensive team in the normalized tracking data and extract one or more unique identifies contained therein, corresponding to the offensive team.

Figure 6:
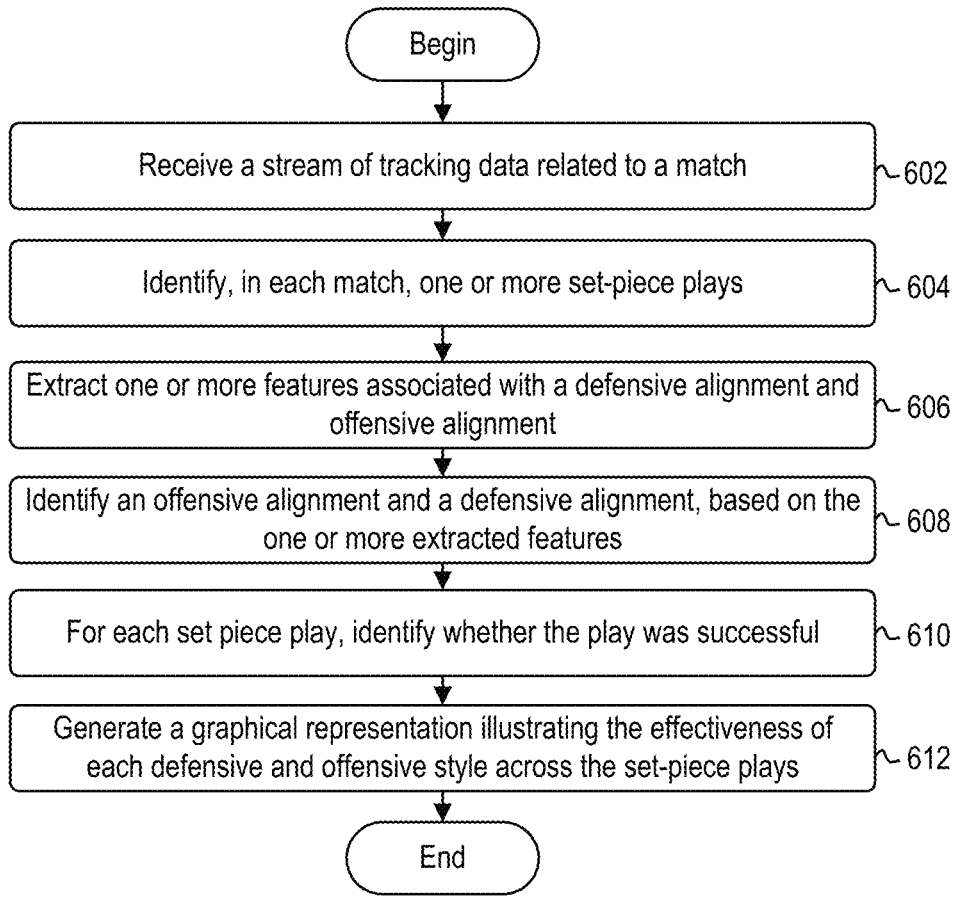
FIG. 6 is a flow diagram illustrating a method of classifying a defensive alignment and an offensive alignment in a set-piece, according to example embodiments.

FIG. 6 is a flow diagram illustrating a method 600 of classifying an offensive alignment and a defensive alignment of a set piece, according to example embodiment. Method 600 may begin at step 602.

At step 602, classification agent 120 may receive tracking data related to a match. In some embodiments, the tracking data may have an image-like representation. In some embodiments, the tracking data may include a stream of images may be a video feed captured by tracking system 102. For example, the stream of images may be a video feed stored in data store 118. Generally, the tracking data may be live (or near live) data or historical data.

At step 604, pre-processing engine 116 may parse the tracking data to identify one or more set-piece plays contained therein. In other words, pre-processing engine 116 may be configured to filter the tracking data to identify those portions of the tracking data that include a set-piece play. Such set-piece plays may include, for example, a corner kick or a free kick.

At step 606, classification module 120 may extract one or more features associated with a defensive alignment and an offensive alignment from the one or more portions of tracking data that contain set-pieces. For example, pre-processing engine 116 may extract from the tracking data one or more portions thereof that include player motion before and after a set-piece occurs. CNN 126 may extract one or more features corresponding to the defense and one or more features corresponding to the offense from the one or more playset-pieces based on the unique identifiers learned in the training process. For example, CNN 126 may identify the defensive team in tracking data, locate one or more unique identifiers contained therein, and extract one or more features corresponding to the one or more unique identifiers from the tracking data.

At step 608, classification module 120 may identify an offensive alignment and a defensive alignment, based on the one or more extracted features. For example, machine learning module 128 may identify an offensive alignment based on the hand-crafted features 130 defined in FIG. 2.

Machine learning module 128 may further identify a defensive lineup based on the training performed above in conjunction with FIG. 4.

At step 610, classification module 120 may determine whether each set-piece play was successful. In other words, classification module 120 may determine whether the offense scored (i.e., successful for the offense) or whether the defense stopped the offense from scoring (i.e., successful for the defense). For example, classification module 120 may analyze one or more frames of pictures following the set-piece to determine whether the score has changed.

At step 612, classification module 120 may generate a graphical representation illustrating the effectiveness of each defensive and offensive style across the set-piece plays. For example, classification module 120 may generate a Hinton graph, discussed below in conjunction with FIG. 7A.

Figure 7A:
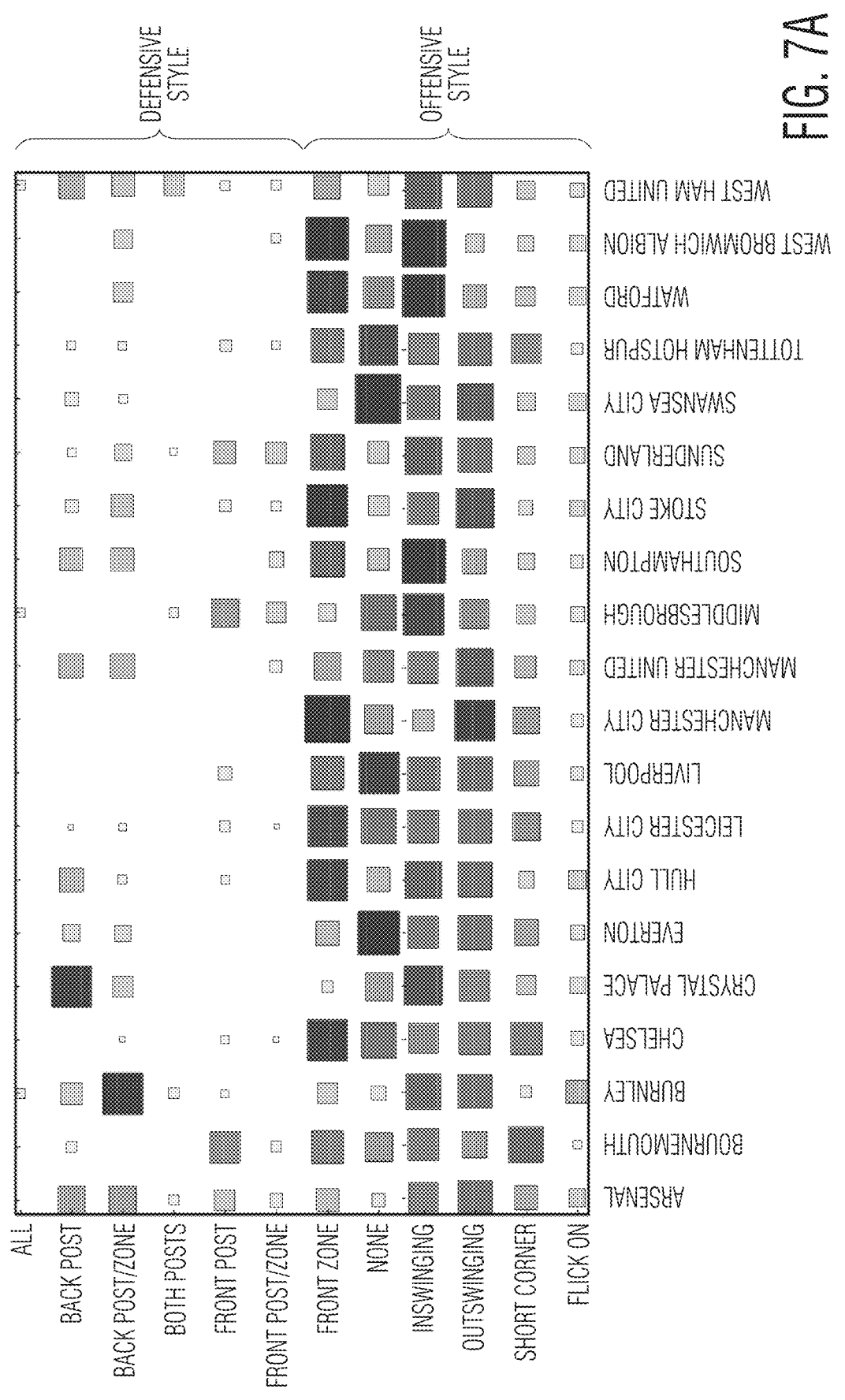

FIG. 7A is a block diagram illustrating a Hinton diagram 700 illustrating a team's offensive and defensive set-piece style, according to example embodiments. To illustrate the benefit of the above approach, an analysis was conducted of the offensive and defensive behaviors of all teams from 2016/17 English Premier League season. Table 1A below illustrates the ranking of all teams with respect to their offensive efficiency. Table 1B illustrates the ranking of all teams with respect to their defensive efficiency.

TABLE 1

Offensive Efficiency

| Ranking | Team | Goals Scored | Shots Taken | Efficiency |
| --- | --- | --- | --- | --- |
| 1 | West Bromwich Albion | 16 | 117 | 13.68% |
| 2 | Swansea City | 13 | 119 | 10.92% |
| 3 | Chelsea | 15 | 144 | 10.42% |
| 4 | Hull City | 9 | 94 | 9.57% |
| 5 | Tottenham Hotspur | 15 | 165 | 9.09% |
| 6 | West Ham United | 10 | 120 | 8.33% |
| 7 | Manchester City | 12 | 161 | 7.45% |
| 8 | Bournemouth | 9 | 123 | 7.32% |
| 9 | Middlesbrough | 6 | 85 | 7.06% |
| 10 | Liverpool | 11 | 161 | 6.83% |
| 11 | Crystal Palace | 9 | 133 | 6.77% |
| 12 | Southampton | 8 | 124 | 6.45% |
| 13 | Leicester City | 6 | 111 | 5.41% |
| 14 | Watford | 7 | 130 | 5.38% |
| 15 | Manchester United | 7 | 130 | 5.38% |
| 16 | Stoke City | 6 | 118 | 5.08% |
| 17 | Arsenal | 7 | 142 | 4.93% |
| 18 | Everton | 6 | 125 | 4.80% |
| 19 | Burnley | 5 | 137 | 3.65% |
| 20 | Sunderland | 2 | 83 | 2.41% |

TABLE 2

Defensive Efficiency

| Ranking | Team | Goals Conceded | Shots Conceded | Efficiency |
| --- | --- | --- | --- | --- |
| 1 | Bournemouth | 6 | 143 | 4.20% |
| 2 | Chelsea | 4 | 92 | 4.35% |
| 3 | Arsenal | 5 | 114 | 4.39% |
| 4 | Liverpool | 5 | 97 | 5.15% |
| 5 | Burnley | 10 | 188 | 5.32% |
| 6 | Tottenham Hotspur | 5 | 92 | 5.43% |
| 7 | West Ham United | 6 | 105 | 5.71% |
| 8 | Manchester City | 6 | 97 | 6.19% |
| 9 | Manchester United | 7 | 107 | 6.54% |
| 10 | West Bromwich Albion | 8 | 119 | 6.72% |
| 11 | Middlesbrough | 10 | 146 | 6.85% |
| 12 | Stoke City | 11 | 155 | 7.10% |

TABLE 2-continued

Defensive Efficiency

| Ranking | Team | Goals Conceded | Shots Conceded | Efficiency |
|---|---|---|---|---|
| 13 | Sunderland | 14 | 178 | 7.87% |
| 14 | Everton | 10 | 125 | 8.00% |
| 15 | Watford | 12 | 146 | 8.22% |
| 16 | Swansea City | 8 | 96 | 8.33% |
| 17 | Leicester City | 11 | 128 | 8.59% |
| 18 | Southampton | 12 | 129 | 9.30% |
| 19 | Crystal Palace | 12 | 122 | 9.84% |
| 20 | Hull City | 17 | 143 | 11.89% |

While it may be useful to measure which teams are effective at scoring or preventing goals from set-pieces, this information alone is not enough for a coach to act upon when preparing for the next game.

Hinton diagram 700 illustrates each team's average attacking and defending set-piece style for the 2016-17 English Premier League season, and their effectiveness at both scoring and preventing goals is visualized. Hinton diagram 700 may illustrate that different teams have different strategies. For example, Chelsea and West Bromwich Albion both scored 16 goals from set-pieces (excluding direct shots from free kicks). However, the method by which they achieved this is significantly different. West Bromwich Albion's corners style was highly predictable with 73% of their corners being in-swinging while Chelsea were much more unpredictable using a mixture of in-swing, outswing and short corners.

Figure 7B:
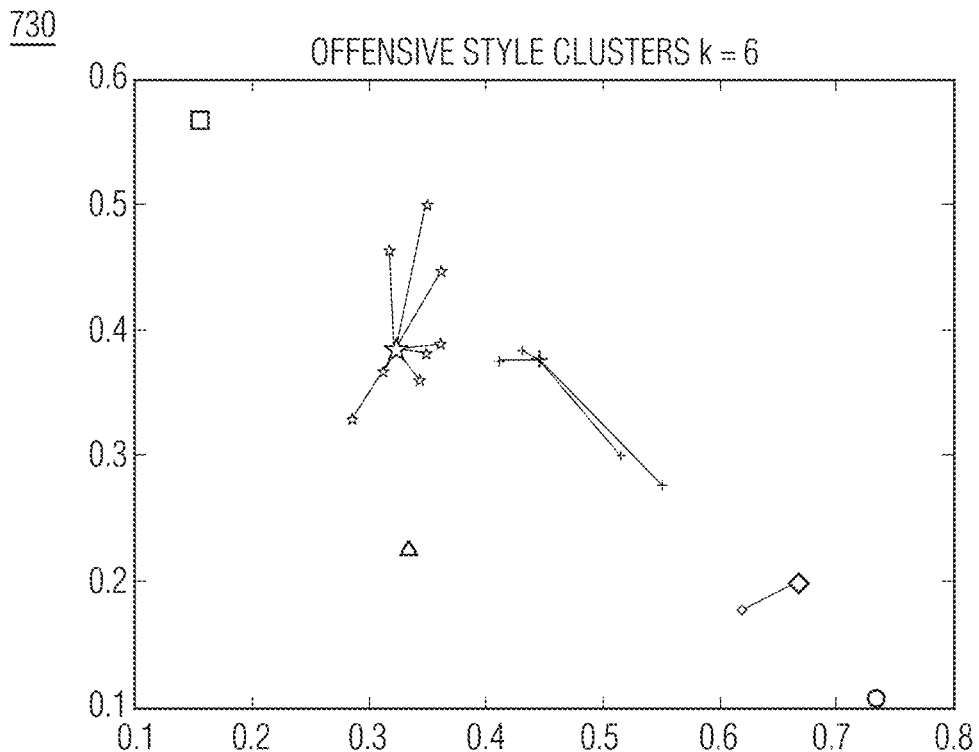
FIG. 7B is a block diagram illustrating one or more graphical elements directed to offensive styles and defensive styles, according to example embodiments.
Figure 7C:
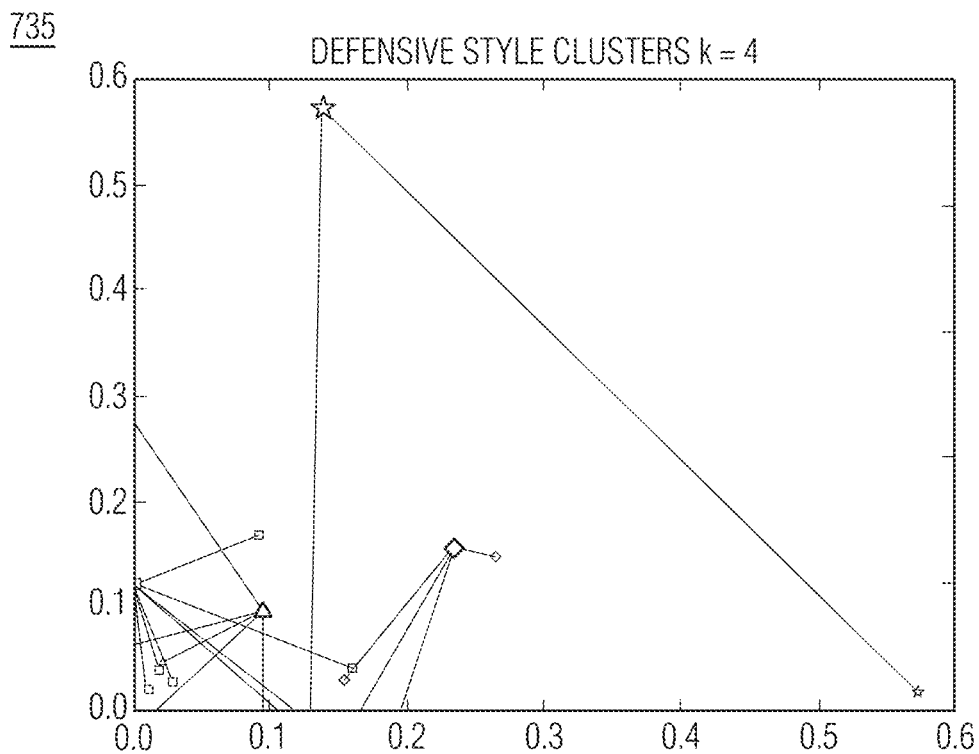
FIG. 7C is a block diagram illustrating one or more graphical elements directed to offensive styles and defensive styles, according to example embodiments.

FIGS. 7B and 7C are a block diagrams illustrating one or more graphical elements directed to offensive styles 730 and defensive styles 735, according to example embodiments.

One of the issues in scouting the opposition for an upcoming game is in selecting the most relevant matches to analyses. The last matchup may be a single example and not necessarily the most relevant due to injuries, personnel changes, home vs. away status, relegation/promotion, and the time since the last matchup may impact the "relevance" of a given match in complex ways. As such, finding sufficient examples may be highly time consuming.

Classification agent 120 may allow teams scouting the opposition to more efficiently analyze their opponents. For example, leveraging the methods discussed above to classify offensive and defensive alignments, classification agent 120 may further determine if a team has a unique attacking or defending style through a method called affinity propagation to cluster the average team behavior.

For example, as illustrated in FIGS. 7B and 7C, six clusters for offensive style were found in graph 730 and four clusters were found for the defensive style in graph 735. For graph 730, classification agent 120 found three unique teams (West Bromwich Albion (square), Manchester City (Circle), and Bournemouth (triangle)). Classification agent 120 further identified a cluster of two teams (Southampton and Watford) (diamond), and two larger clusters which represent teams with large variation in their delivery (star) and teams that focus on inswing and outswing set-pieces (cross). For the graph 735, classification agent 120 may identify four cluster types, which indicates that a team's defensive set-up may be more predictable than a team's attacking style.

Affinity propagation is an unsupervised clustering technique that works by finding one or more exemplars, which may be thought of as centroids. The Euclidean squared distance may then be calculated between the exemplar and all the other teams to determine how similar teams are to each other. The team that best represents the cluster may be identified as the final exemplar. Using this technique an analyst could quickly see if the opponent has played a team within their cluster and see how that team performs against that style both offensively and defensively.

Figure 8A:
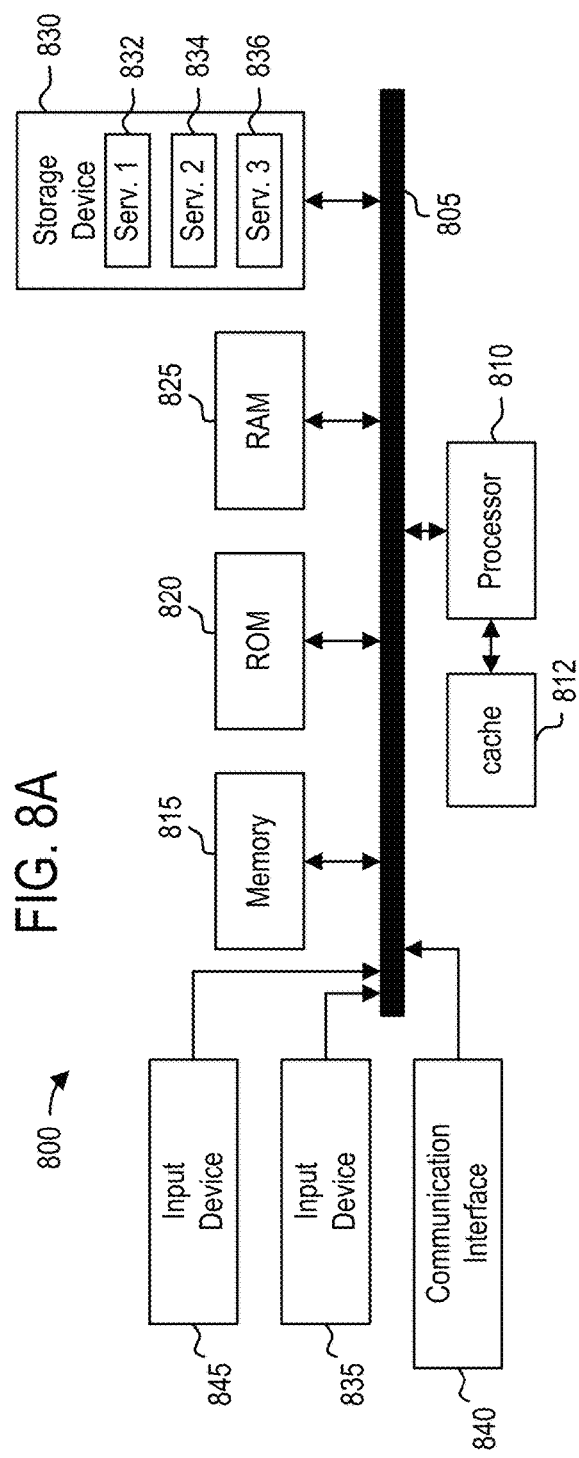
FIG. 8A is a block diagram illustrating a computing device, according to example embodiments.

FIG. 8A illustrates a system bus computing system architecture 800, according to example embodiments. System 800 may be representative of at least a portion of organization computing system 104. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing device 800, an input device 845 may represent any number of input mechanisms, such as a microphone for speech, a touch-sensitive screen for gesture or graphical input, keyboard, mouse, motion input, speech and so forth. An output device 835 may also be one or more of a number of output mechanisms known to those of skill in the art. In some instances, multimodal systems may enable a user to provide multiple types of input to communicate with computing device 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, display 835, and so forth, to carry out the function.

Figure 8B:
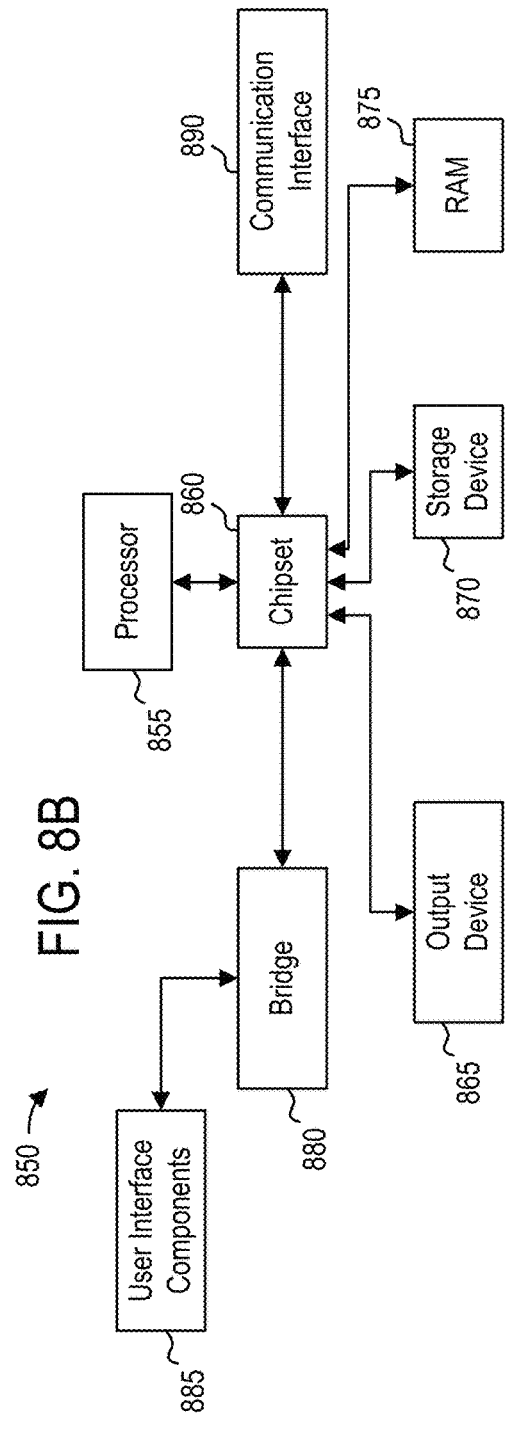
FIG. 8B is a block diagram illustrating a computing device, according to example embodiments.

FIG. 8B illustrates a computer system 850 having a chipset architecture that may represent at least a portion of organization computing system 104. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chip set 860 that may control input to and output from processor 855. In this example, chip set 860 outputs information to output 865, such as a display, and may read and write information to storage device 870, which may include magnetic media, and solid state media, for example. Chipset 860 may also read data from and write data to RAM 875. A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage 870 or 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of identifying a team alignment during a set-piece, comprising:
   receiving, by a computing system, one or more streams of tracking data associated with one or more matches;
   identifying, by the computing system, one or more set-piece plays contained in the one or more streams of the tracking data, wherein the one or more set-piece plays include a portion of the one or more matches where play is started following a stoppage or re-started following the stoppage;
   identifying, by the computing system, a defensive alignment of a first team by:
   extracting, by the computing system via a trained convolutional neural network, one or more features corresponding to a type of defensive alignment implemented by the first team by passing each of the set-piece plays through the trained convolutional neural network, wherein the one or more features include one or more local edge patterns, one or more interactions, or one or more player locations;
   identifying, by the computing system, an offensive alignment of a second team by:
   scanning each of the one or more set-piece plays, by the computing system via the trained convolutional neural network, to identify one or more features indicative of a type of offensive alignment implemented by the second team;
   determining, by the computing system, a success outcome for each of the one or more set-piece plays;
   generating, by the computing system, a first graphical representation of the defensive alignment or the offensive alignment and a corresponding effectiveness, wherein the effectiveness is based on the success outcome for each of the one or more set-piece plays, and wherein the effectiveness indicates whether the defensive alignment was successful or whether the offensive alignment was successful; and
   generating, by the computing system, a second graphical representation that includes a cluster of an average team behavior for the first team or the second team, wherein the average team behavior is determined based on the extracting and the scanning,
   wherein the convolutional neural network is trained by:
   retrieving a set of match data from a data store,
   identifying, in each match, one or more set-piece plays,
   extracting player motion before and after each set-piece play, and
   learning one or more features unique to each offensive and defensive alignment found in the set of match data.

2. The method of claim 1, wherein receiving, by the computing system, the one or more streams of the tracking data, comprises:
   receiving one or more streams of live tracking data from a tracking system located in a remote venue.

3. The method of claim 1, wherein identifying, by the computing system, the one or more set-piece plays contained in the one or more streams of the tracking data, comprises:

extracting a subset of tracking data from the one or more streams of the tracking data, wherein the subset of tracking data comprises agent motion before and after the one or more set-piece plays.

4. The method of claim 1, wherein the tracking data comprises one or more images of the one or more matches.

5. The method of claim 1, wherein the one or more streams of the tracking data are image-based representations of the one or more matches.

6. The method of claim 1, the identifying, by the computing system, the defensive alignment of the first team further comprising:
   determining, by the computing system, one or more unique identifiers based on the tracking data; and
   extracting, by the computing system via the trained convolutional neural network, the one or more features corresponding to the type of defensive alignment based on the one or more unique identifiers.

7. A system for identifying a defensive alignment and an offensive alignment in a set-piece, comprising:
   a processor; and
   a memory having programming instructions stored thereon, which, when executed by the processor, performs one or more operations comprising:
   receiving one or more streams of tracking data associated with one or more matches;
   identifying one or more set-piece plays contained in the one or more streams of the tracking data, wherein the one or more set-piece plays include a portion of the one or more matches where play is started following a stoppage or re-started following the stoppage;
   identifying a defensive alignment of a first team by:
   extracting, via a trained convolutional neural network, one or more features corresponding to a type of defensive alignment implemented by the first team by passing each of the set-piece plays through the trained convolutional neural network, wherein the one or more features include one or more local edge patterns, one or more interactions, or one or more player locations;
   identifying an offensive alignment of a second team by:
   scanning each of the one or more set-piece plays, via the trained convolutional neural network, to identify one or more features indicative of a type of offensive alignment implemented by the second team;
   determining a success outcome for each of the one or more set-piece plays;
   generating a first graphical representation of the defensive alignment or the offensive alignment and a corresponding effectiveness, wherein the effectiveness is based on the success outcome for each of the one or more set-piece plays, and wherein the effectiveness indicates whether the defensive alignment was successful or whether the offensive alignment was successful; and
   generating a second graphical representation that includes a cluster of an average team behavior for the first team or the second team, wherein the average team behavior is determined based on the extracting and the scanning,
   wherein the convolutional neural network is trained by:
   retrieving a set of match data from a data store,
   identifying, in each match, one or more set-piece plays,
   extracting player motion before and after each set-piece play, and
   learning one or more features unique to each offensive and defensive alignment found in the set of match data.

8. The system of claim 7, wherein receiving the one or more streams of the tracking data, comprises:
   receiving one or more streams of live tracking data from a tracking system located in a remote venue.

9. The system of claim 7, wherein identifying the one or more set-piece plays contained in the one or more streams of the tracking data, comprises:
   extracting a subset of tracking data from the one or more streams of the tracking data, wherein the subset of tracking data comprises agent motion before and after the one or more set-piece plays.

10. The system of claim 9, further wherein the tracking data comprises one or more images of the one or more matches.

11. The system of claim 10, wherein the one or more streams of the tracking data are image-based representations of the one or more matches.

12. The system of claim 7, the identifying the defensive alignment of the first team further comprising:
   determining one or more unique identifiers based on the tracking data; and
   extracting, via the trained convolutional neural network, the one or more features corresponding to the type of defensive alignment based on the one or more unique identifiers.

13. A non-transitory computer readable medium including one or more sequences of instructions that, when executed by one or more processors, causes a computing system to perform operations comprising:
   receiving, by the computing system, one or more streams of tracking data associated with one or more matches;
   identifying, by the computing system, one or more set-piece plays contained in the one or more streams of the tracking data, wherein the one or more set-piece plays include a portion of the one or more matches where play is started following a stoppage or re-started following the stoppage;
   identifying, by the computing system, a defensive alignment of a first team by:
   extracting, by the computing system via a trained convolutional neural network, one or more features corresponding to a type of defensive alignment implemented by the first team by passing each of the set-piece plays through the trained convolutional neural network, wherein the one or more features include one or more local edge patterns, one or more interactions, or one or more player locations;
   identifying, by the computing system, an offensive alignment of a second team by:
   scanning each of the one or more set-piece plays, by the computing system via the trained convolutional neural network, to identify one or more features indicative of a type of offensive alignment implemented by the second team;
   determining, by the computing system, a success outcome for each of the one or more set-piece plays; and
   generating, by the computing system, a first graphical representation of the defensive alignment or the offensive alignment and a corresponding effectiveness, wherein the effectiveness is based on the success outcome for each of the one or more set-piece plays, and wherein the effectiveness indicates whether the defensive alignment was successful or whether the offensive alignment was successful; and
   generating, by the computing system, a second graphical representation that includes a cluster of an average team behavior for the first team or the second team, wherein the average team behavior is determined based on the extracting and the scanning, wherein the convolutional neural network is trained by:
retrieving a set of match data from a data store,
identifying, in each match, one or more set-piece plays,
extracting player motion before and after each set-piece play, and
learning one or more features unique to each offensive and defensive alignment found in the set of match data.

14. The non-transitory computer readable medium of claim 13, wherein receiving, by the computing system, the one or more streams of tracking data, comprises:
receiving one or more streams of live tracking data from a tracking system located in a remote venue.

15. The non-transitory computer readable medium of claim 13, where in identifying, by the computing system, the one or more set-piece plays contained in the one or more streams of the tracking data, comprises:
extracting a subset of tracking data from the one or more streams of the tracking data, where in the subset of tracking data comprises agent motion before and after the one or more set-piece plays.

16. The non-transitory computer readable medium of claim 13, wherein the tracking data comprises one or more images of the one or more matches.

17. The non-transitory computer readable medium of claim 13, where in the one or more streams of the tracking data are image-based representations of the one or more matches.

* * * * *

UNITED STATES PATENT AND TRADEMARK OFFICE
CERTIFICATE OF CORRECTION

| | |
|---|---|
| PATENT NO. | : 12,182,714 B2 |
| APPLICATION NO. | : 16/254128 |
| DATED | : December 31, 2024 |
| INVENTOR(S) | : Power et al. |

It is certified that error appears in the above-identified patent and that said Letters Patent is hereby corrected as shown below:

In the Claims

On Column 17, Claim 15, Line 14, delete "where in" and insert --wherein--,

On Column 17, Claim 15, Line 18, delete "where in" and insert --wherein--,

On Column 17, Claim 17, Line 25, delete "where in" and insert --wherein--.

Signed and Sealed this
Eighteenth Day of February, 2025

Coke Morgan Stewart
*Acting Director of the United States Patent and Trademark Office*